(12) United States Patent
De Ruffray et al.

(10) Patent No.: US 9,216,811 B2
(45) Date of Patent: Dec. 22, 2015

(54) AIRCRAFT COMPRISING AN IMPROVED CONNECTION ZONE BETWEEN A FRONT BEAM AND A FRONT LOWER FUSELAGE SECTION

(71) Applicant: Airbus Operations (SAS), Toulouse (FR)

(72) Inventors: Paul De Ruffray, Colomiers (FR); Benoit Thomas, Brax (FR); Jean-Michel Laboire, Tournefuille (FR); Guillaume Delest, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 20 days.

(21) Appl. No.: 14/288,676

(22) Filed: May 28, 2014

(65) Prior Publication Data
US 2014/0353426 A1    Dec. 4, 2014

(30) Foreign Application Priority Data
May 29, 2013    (FR) ...................................... 13 54852

(51) Int. Cl.
*B64C 1/06* (2006.01)
*B64C 1/26* (2006.01)

(52) U.S. Cl.
CPC . *B64C 1/26* (2013.01); *B64C 1/064* (2013.01); *B64C 1/069* (2013.01)

(58) Field of Classification Search
CPC ........ B64C 1/069; B64C 1/068; B64C 1/065; B64C 1/064; B64C 1/061; B64C 1/06; B64C 1/10
See application file for complete search history.

(56) References Cited

U.S. PATENT DOCUMENTS

| | | | |
|---|---|---|---|
| 8,302,909 B2 * | 11/2012 | Cazeneuve et al. | 244/120 |
| 2008/0210819 A1 | 9/2008 | Jarsaillon et al. | |
| 2010/0258676 A1 | 10/2010 | Gauthie et al. | |
| 2012/0104170 A1 | 5/2012 | Gallant et al. | |
| 2013/0089712 A1 * | 4/2013 | Kwon et al. | 29/897.2 |

FOREIGN PATENT DOCUMENTS

| | | |
|---|---|---|
| FR | 2910874 | 7/2008 |
| FR | 2922517 | 4/2009 |
| WO | 2011001050 | 1/2011 |

OTHER PUBLICATIONS

French Search Report, Feb. 5, 2014.

* cited by examiner

*Primary Examiner* — Tien Dinh
*Assistant Examiner* — Richard R Green
(74) *Attorney, Agent, or Firm* — Greer, Burns & Crain Ltd.

(57) ABSTRACT

An aircraft comprising a front beam having stiffeners and a front lower fuselage section having stiffeners, each stiffener comprising a core and at least one bearing surface. Each stiffener of the front beam is connected to a stiffener of the lower fuselage section by at least one batten which abuts against the bearing surfaces of the stiffeners. A sealed wall is arranged in a transverse plane which corresponds approximately to the connection plane between the front beam and the front lower fuselage section. The sealed wall includes cut-outs in order to allow the stiffeners and the battens to pass.

9 Claims, 7 Drawing Sheets

AIRCRAFT COMPRISING AN IMPROVED CONNECTION ZONE BETWEEN A FRONT BEAM AND A FRONT LOWER FUSELAGE SECTION

CROSS-REFERENCES TO RELATED APPLICATIONS

This application claims the benefit of the French patent application No. 13 54852 filed on May 29, 2013, the entire disclosures of which are incorporated herein by way of reference.

BACKGROUND OF THE INVENTION

The present invention relates to an aircraft comprising an improved connection zone between a front beam and a front lower fuselage section.

Figure 1:
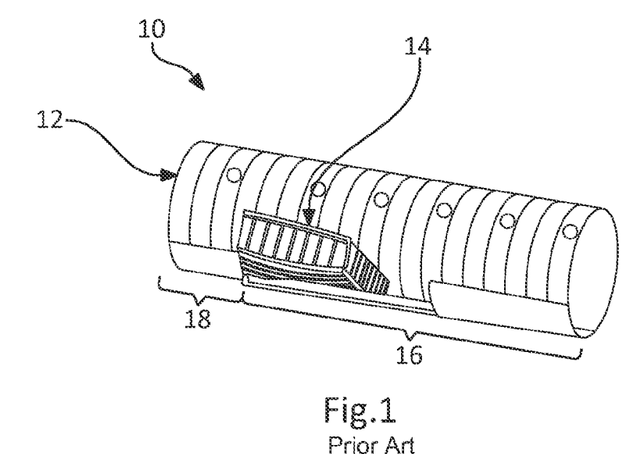
FIG. 1 is a schematic, perspective view of the structure of a portion of an aircraft.

As illustrated in FIG. 1, an aircraft 10 comprises a fuselage 12 having several sections which are arranged at the front and at the rear of a central wing box 14 which allows the wing unit of the aircraft to be connected to the fuselage thereof. The aircraft also comprises a front beam 16 which ensures structural continuity between the sections arranged at the front and at the rear of the central wing box.

In this manner, the end of the front beam 16 is connected to a stiffened panel which forms a portion of the fuselage which is also referred to as the front lower fuselage section 18.

Figure 2:
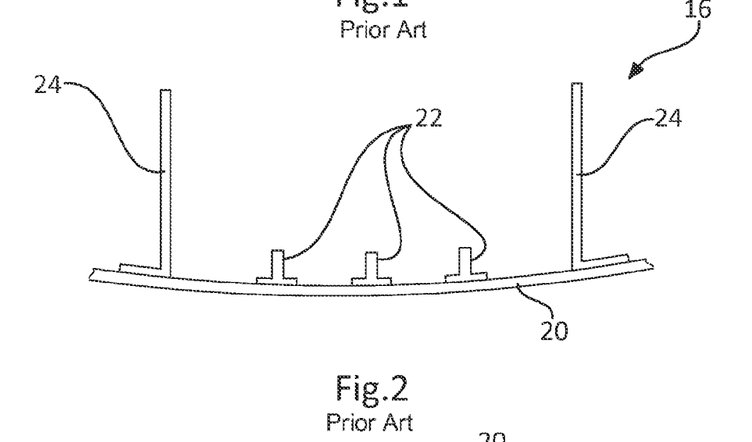
FIG. 2 is a cross-section of a front beam of an aircraft according to a known embodiment.

According to an embodiment illustrated in FIG. 2, the front beam 16 comprises a lower panel 20 which is stiffened using T-shaped stringers 22 whose head of the T is pressed against the inner face of the lower panel 20 and side panels 24 which are substantially mutually parallel and parallel with the T-shaped stringers 22 which extend in planes which are substantially orthogonal with respect to the surface of the lower panel 20. The T-shaped stringers 22 and the bases of the side panels 24 do not extend beyond the edge forming the front end of the lower panel 20.

Figure 3:
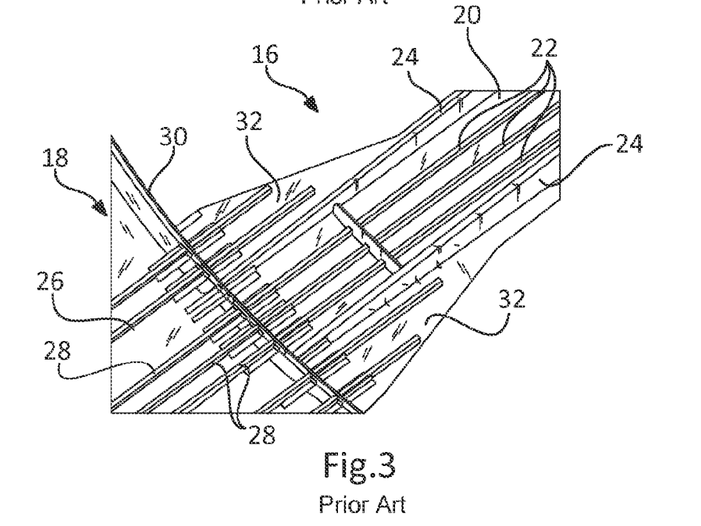
FIG. 3 is a perspective view of a connection zone between a front beam and a front lower fuselage section of an aircraft according to an assembly method of the prior art.

As illustrated in FIG. 3, the front lower fuselage section 18 comprises a panel 26 which is stiffened using T-shaped stringers 28 whose head is pressed against the inner face of the panel 26. The T-shaped stringers 28 do not extend beyond the edge forming the rear end of the front lower fuselage section 18.

The T-shaped stringers 22, 28 and the side panels 24 are orientated in accordance with the longitudinal direction of the aircraft.

In the region of the connection zone, the structure of the aircraft comprises a reinforcement and sealing frame 30 to which there is secured a sealed wall which is arranged in a transverse plane perpendicular relative to the longitudinal direction. In this instance, this sealed wall is the extension towards the bottom of the front spar of the central wing box.

According to an embodiment of the prior art, the connection between the front beam 16 and the front lower fuselage section 18 is of the hybrid type. In this manner, this connection comprises inside the fuselage titanium fittings which ensure the connection:

between the T-shaped stringers 28, the panel 26 of the front lower fuselage section 18 and the reinforcement frame 30, between the T-shaped stringers 22, the lower panel 20 of the front beam and the reinforcement frame 30, and between the side panels 24, the lower panel 20 of the front beam and the reinforcement frame 30.

The connection comprises at the outer side of the fuselage a ferrule of composite material which is in the form of a plate which is pressed in a straddling manner against the outer face of the lower panel 20 of the front beam and the outer face of the panel 26 of the front lower fuselage section.

In order to ensure the transmission of forces, it is necessary to widen the front end of the front beam 16 using two widened portions 32 which are arranged symmetrically at one side and the other of the front beam 16.

This solution therefore leads to the on-board mass being increased.

Document FR-2.922.517 proposes a solution in order to ensure the orientation of the forces between two stiffeners of the skin of the fuselage of an aircraft, which stiffeners are arranged at one side and the other of a sealed wall. According to FIG. 2 of this document, the two stiffeners are connected by means of a batten which comprises a planar central portion which is interposed between the skin of the fuselage and the reinforcement frame and, at one side and the other of this central portion, zones for covering and connection to the stiffeners to be connected. The planar central portion has a small thickness so that it is not necessary to create a cut-out in the sealed wall. However, it must have a large width in order to ensure the transmission of forces between the two stiffeners. The batten comprises at one side and the other of the central portion volumic shapes which define housings in which the stiffeners to be connected are capable of being accommodated and being fixed.

This solution has the advantage of replacing metal fittings with battens of composite material and therefore reducing the on-board mass.

However, this solution requires that the stiffeners be perfectly aligned in the longitudinal direction at one side and the other of the reinforcement frame, which is not necessarily the case between, on the one hand, the T-shaped stringers 22 and the side panels 24 of the front beam 16 and, on the other hand, the T-shaped stringers 28 of the front lower fuselage section 18.

Therefore, the present invention is intended to overcome the disadvantages of the prior art.

SUMMARY OF THE INVENTION

To this end, the invention relates to an aircraft comprising a front beam having stiffeners and a front lower fuselage section having stiffeners, each reinforcement comprising a core and at least one bearing surface, each reinforcement of the front beam being connected to a reinforcement of the lower fuselage section by means of at least one batten which abuts against the bearing surfaces of the stiffeners, a sealed wall being arranged in a transverse plane which corresponds approximately to the connection plane between the front beam and the front lower fuselage section, characterized in that the sealed wall comprises cut-outs in order to allow the stiffeners and the battens to pass.

In this manner, in contrast to the prior art, the sealed wall does not interrupt the continuity of the stiffeners which pass through it. This design promotes the transmission of forces between the front beam and the front lower fuselage section so that it is possible to reduce the width of the front edge of the front beam via which the forces pass.

Advantageously, the aircraft comprises sealing means between the sealed wall and the assembly formed by the front beam, the front lower fuselage section, and the battens. Preferably, the sealing means comprise fittings having three mutually perpendicular walls, a first wall which is pressed against the sealed wall, a second wall being parallel with the panel and a third wall parallel with the core of the stiffeners, the fittings being of titanium and transmitting forces between, on the one hand, the sealed wall and, on the other hand, the front lower fuselage section and the front beam.

According to a preferred embodiment, the sealing means comprise plates of composite material which are fixed against the sealed wall above the stiffeners.

Advantageously, the front beam comprises first stiffeners which correspond to stringers and second stiffeners which correspond to side panels. The second stiffeners of the front beam each comprise an extension which extends beyond the front edge of the front beam in order to move into a perpendicular state relative to the front lower fuselage section. The front lower fuselage section comprises first stiffeners which extend in continuation of the first stiffeners of the front beam and second stiffeners which extend in continuation of the second stiffeners of the front beam. The second stiffeners of the front lower fuselage section each comprise an end which is remote from the rear edge of the front lower fuselage section so that the second stiffeners of the front beam and the front lower fuselage section are arranged end-to-end.

This configuration ensures better transmission of the forces between the front beam and the front lower fuselage section and increased rigidity with respect to fuselage flexion. In this manner, it is no longer necessary to widen the front end of the front beam as a result.

Preferably, the core of the second stiffeners of the front beam comprises a cut-out in the region of the lower edge thereof in a state perpendicular to the front edge of the front beam. According to a preferred embodiment, each cut-out has a substantially elliptical, curved shape.

Advantageously, an aircraft comprises, for each second reinforcement of the front beam, an external attach angle and an internal attach angle which are arranged at one side and the other of the second reinforcement, the attach angles being arranged so as to straddle the front beam and the front lower fuselage section.

BRIEF DESCRIPTION OF THE DRAWINGS

Other features and advantages will be appreciated from the following description of the invention, which description is given purely by way of example, with respect to the appended drawings, in which.

DETAILED DESCRIPTION OF THE PREFERRED EMBODIMENTS

Figure 4:
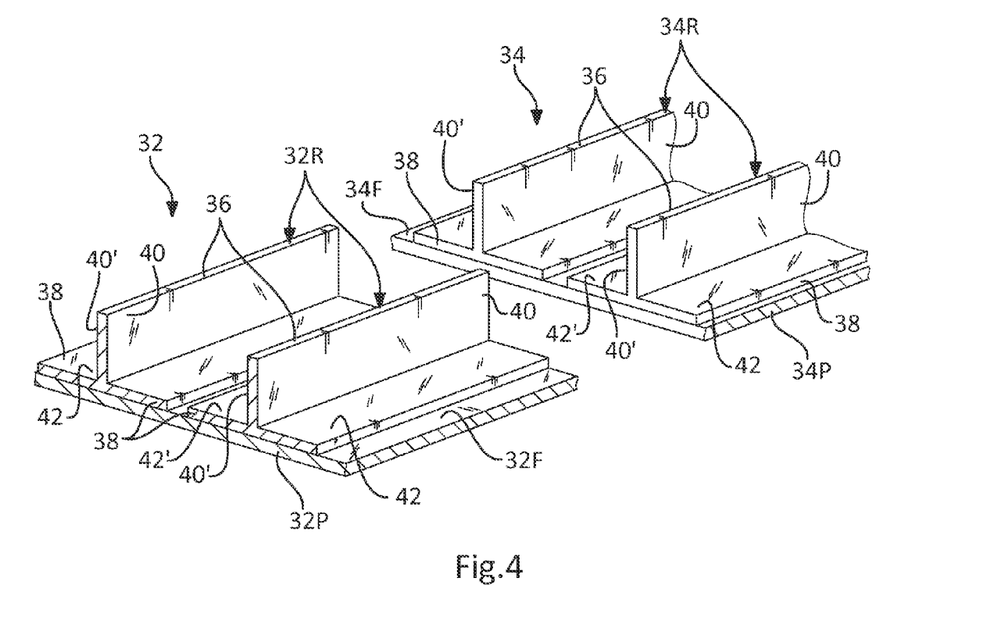
FIG. 4 is a perspective view of two stiffened panels to be assembled.

In FIG. 4, two stiffened panels 32 and 34 are partially illustrated. The stiffened panels 32 and 34 each comprise a panel 32P, 34P with at least one reinforcement 32R, 34R on one of the faces 32F, 34F thereof.

According to one application, the stiffened panels 32 and 34 are used to form the fuselage of an aircraft and the stiffeners 32R and 34R are provided in the region of the faces 32F and 34F orientated towards the inner side of the fuselage.

For the remainder of the description, the longitudinal axis of the aircraft corresponds to the axis which extends from the front tip to the rear tip of the aircraft. A longitudinal direction is parallel with the longitudinal axis. A transverse plane corresponds to a plane perpendicular relative to the longitudinal direction.

According to an embodiment, the panels 32P and 34P are of composite material.

The stiffeners 32R and 34R are parallel with the longitudinal direction. Preferably, the stiffeners 32R have the same cross-section as the stiffeners 34R.

According to an embodiment, the stiffeners 32R and 34R are of composite material.

The stiffeners 32R and 34R are fixedly joined to the panels 32P and 34P by any appropriate means, riveting, adhesive bonding, co-baking or the like.

Each reinforcement 32R and 34R comprises a core 36 which extends in a plane which is substantially orthogonal with respect to the inner surface relative to the panel 32P or 34P and at least one base 38 which is pressed against the panel 32P or 34P. The core 36 and the base 38 are produced in one piece.

Preferably, each reinforcement 32R and 34R comprises a base 38 or a base portion 38 at one side and the other of the core 36.

The core 36 comprises at least one substantially planar bearing surface 40 (corresponding to one of the faces of the core) and preferably two bearing surfaces 40 and 40' which are substantially planar and parallel (corresponding to the two faces of the core). Each bearing face 40, 40' is arranged in a plane perpendicular to the panel 32P, 34P.

In a complementary manner, the base 38 comprises at least one bearing surface 42 (corresponding to the face of the base which is not in contact with the panel 32P, 34P). Preferably, the base(s) 38 comprise(s) two bearing surfaces 42, 42' which are arranged at one side and the other of the core 36.

According to an embodiment, some stiffeners are T-shaped stringers, the base of the T forming the core 36 and the head of the T forming the base 38.

For some applications, the stiffeners 32R and 34R are not aligned in the longitudinal direction.

Figure 5:
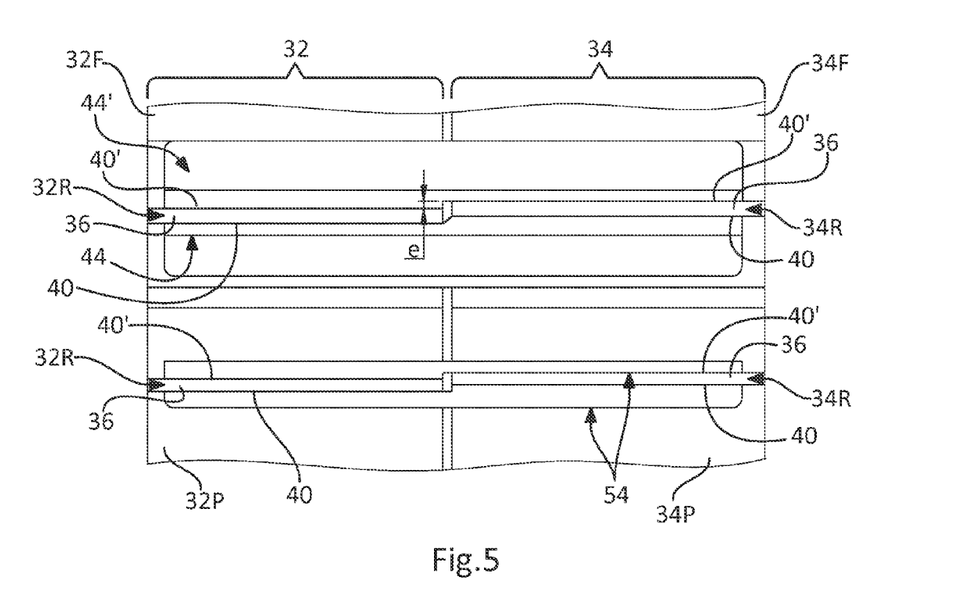
FIG. 5 is a plan view of the two stiffened panels of FIG. 4 assembled with battens illustrating the invention.

In this manner, according to a first alignment error illustrated in FIG. 5, the bearing surfaces 40 (or 40') of the cores of the stiffeners 32R and 34R are not coplanar but parallel and offset by an offset e. The bearing surfaces 42 (or 42') of the bases of the stiffeners are preferably coplanar.

In this instance, the assembly of the stiffened panels 32 and 34 comprises battens 44 which ensure the connection of the stiffeners 32R of the panel 32 to the stiffeners 34R of the panel 34.

Figure 6A:
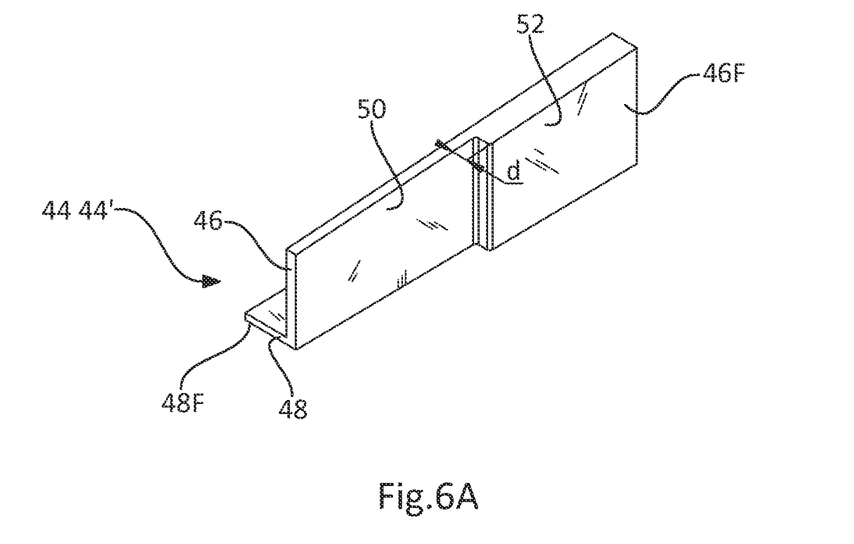
FIG. 6A is a perspective view of a batten according to a first variant of the invention.

According to a first variant illustrated in FIG. 6A, a batten 44 has an L-shaped cross-section and comprises two wings 46 and 48 which are produced in one piece.

Each wing 46 comprises a face 46F which is pressed against the cores 36 of two stiffeners 32R and 34R. Each wing 48 comprises a face 48F which is pressed against the bases 38 of two stiffeners 32R and 34R.

According to a feature of the invention, at least one of the wings 46 (or 48) of a batten 44 comprises a face 46F (or 48F) with two non-coplanar contact surfaces 50, 52, one for the bearing surface 40 of the stiffener 32R and another for the bearing surface 40 of the stiffener 34R. Preferably, the faces 46F and/or 48F comprise contact surfaces 50 and 52 which have the same surface-area.

When the bearing surfaces 40 of the cores of the stiffeners 32R and 34R are parallel and offset by an offset e, the contact surfaces 50 and 52 of the face 46F are parallel and offset by an offset d substantially equal to e, as illustrated in FIG. 6.

Preferably, the battens 44 are produced from composite material. The offset between the contact surfaces 50 and 52 results from a machining of non-stress-bearing folds. In this manner, in the zone of the contact surface 50, the wing 46 does not comprise the same number of folds as in the zone of the contact surface 52.

In order to assemble the batten 44 with the pair of stiffeners 32R and 34R, the wing 46 of the batten 44 is pressed against the bearing surfaces 40 of the cores 36 of the stiffeners 32R and 34R, and the wing 48 of the batten 44 is pressed against the bearing surfaces 42 of the bases 38 of the stiffeners 32R and 34R and/or the lower faces of the panels 32P and 34P.

The batten 44 is fixed to the stiffened panels 32, 34 using any appropriate means, such as, for example, adhesive bonding or riveting.

Advantageously, for each pair of stiffeners 32R and 34R, the assembly comprises two battens 44 and 44' which are arranged at one side and the other of the cores 36 of the stiffeners 32R and 34R in order to obtain a dual-shearing assembly.

In this manner, as illustrated in FIG. 5, the wing 46 of the batten 44 is fixedly joined to the bearing surfaces 40 of the cores 36 of the stiffeners 32R and 34R, and the wing 48 of the batten 44 is fixedly joined to the bearing surfaces 42 of the bases of the stiffeners and/or to the inner faces of the panels 32P and 34P.

The wing 46 of the batten 44' is fixedly joined to the bearing surfaces 40' of the cores 36 of the stiffeners 32R and 34R, and the wing 48 of the batten 44' is fixedly joined to the bearing surfaces 42' of the bases of the stiffeners and/or to the inner faces of the panels 32P and 34P.

Since the thicknesses of the cores 36 of the stiffeners 32R and 34R are equal, the battens 44, 44' arranged at one side and the other of the cores 36 are identical and comprise the same offset d between the contact surfaces 50 and 52. They are arranged head to toe.

Generally, the bearing surfaces 42, 42' of the bases of the stiffeners 32R and 34R are coplanar. In this manner, the wing 48 of the battens 44, 44' has only one contact surface which extends over the entire face 48F of the wing 48.

However, it is possible to provide two non-coplanar contact surfaces in the region of the face 48F of the wing 48.

Figure 6B:
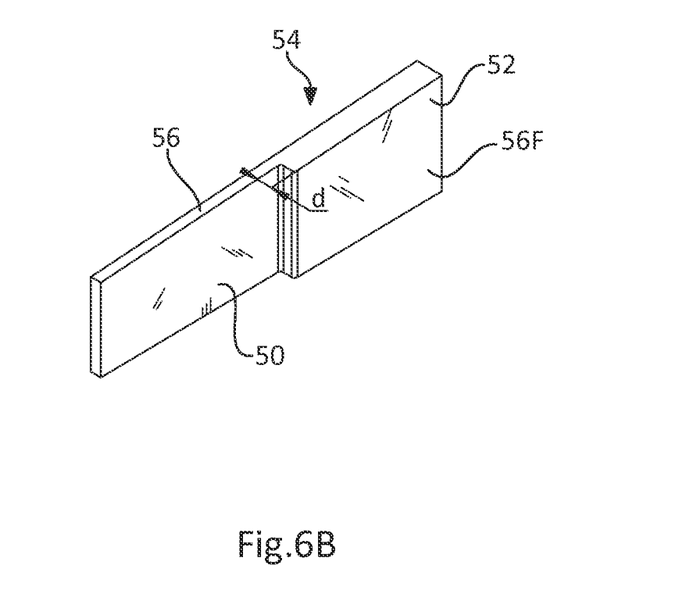
FIG. 6B is a perspective view of a batten according to a second variant of the invention.

According to a second variant illustrated in FIG. 6B, a batten 54 has an I-shaped cross-section and comprises a single wing 56 which has a face 56F which is pressed against the bearing surfaces 40 (or 40') of the cores 36 of the stiffeners 32R and 34R.

The face 56F comprises two contact surfaces 50, 52 with an offset d.

Figures 7, 8:
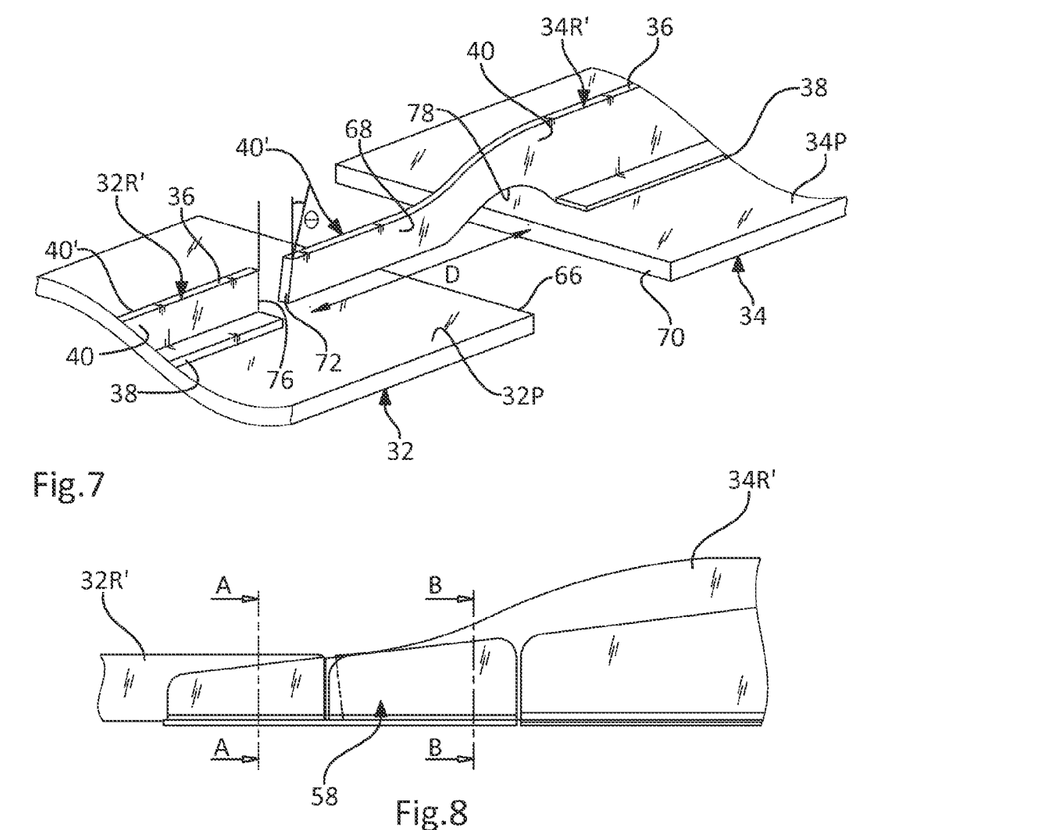
FIG. 7 is a perspective view of a portion of a front beam and a portion of a front lower fuselage section, before being assembled, illustrating an embodiment of the invention.
FIG. 8 is a side view of the elements of FIG. 7 assembled with a batten.
Figure 9A:
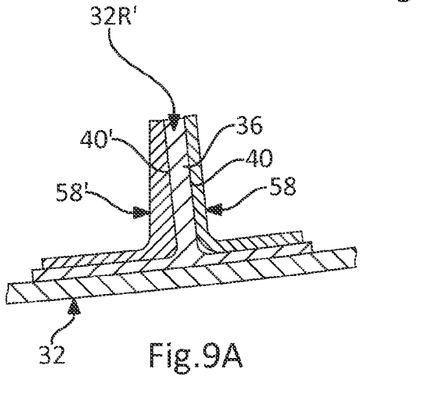
FIG. 9A is a section along line AA of FIG. 8.
Figure 9B:
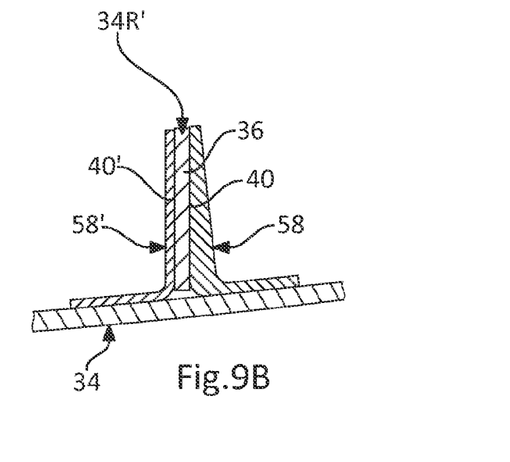
FIG. 9B is a section along line BB of FIG. 8, FIGS. 10 and 11 are perspective views of battens illustrating the invention.

According to another configuration illustrated in FIGS. 7, 9A and 9B, the stiffened panels 32 and 34 comprise stiffeners 32R' and 34R', respectively, whose bearing surfaces 40 of the cores are not coplanar but instead offset angularly. In this manner, in a transverse plane, the bearing surfaces 40 form an offset angle $\theta$.

Figures 10, 11:
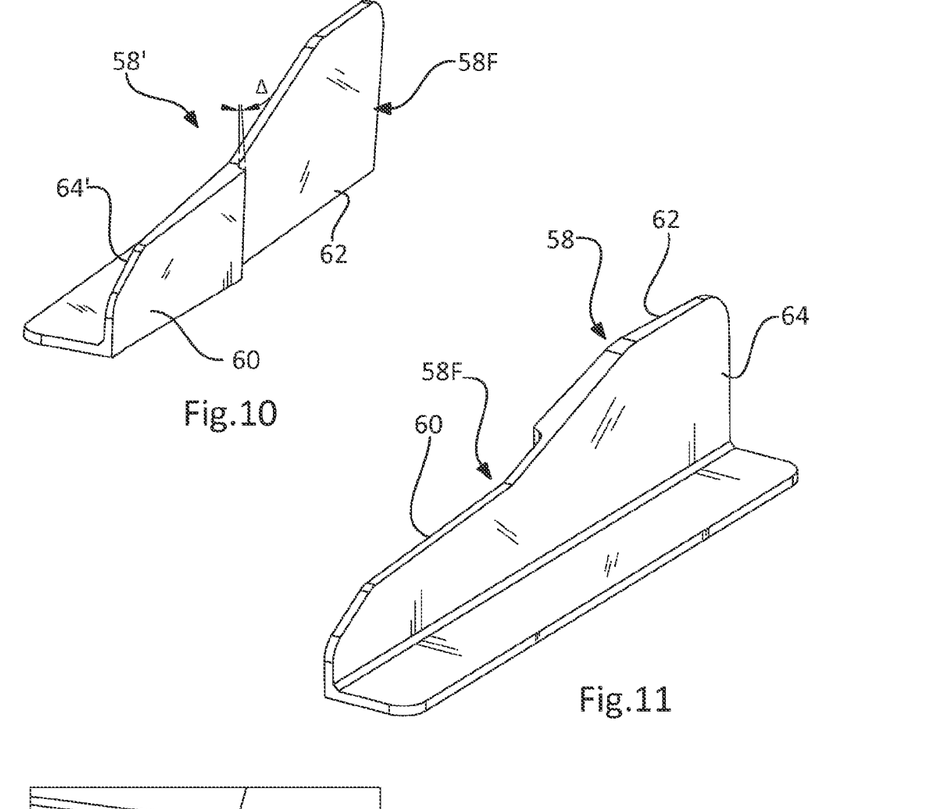

In order to correct this misalignment, a batten 58 comprises in the region of at least one face 58F two contact surfaces 60 and 62 with an angular offset $\Delta$ as illustrated in FIGS. 10 and 11, the angular offset $\Delta$ being approximately equal to the offset angle $\theta$.

In the same manner as the battens 44, 44', 54, the battens 58 are preferably produced from composite material. The offset between the contact surfaces 60 and 62 results from a machining of non-stress-bearing folds or machining of at least one of the two contact surfaces 60, 62.

As illustrated in FIGS. 9A, 9B, 10 and 11, the battens 58, 58' arranged at one side and the other of the same pair of stiffeners 32R' and 34R' may have complementary profiles.

In this manner, the wing 64 of the batten 58 has a constant thickness over the height thereof in the region of the rear portion thereof and a thickness which increases progressively from top to bottom in the region of the front portion in order to correct the angular offset (or vice versa).

The wing 64' of the batten 58' has a constant thickness over the height thereof in the region of the front portion thereof and a thickness which increases progressively from top to bottom in the region of the rear portion thereof in order to correct the angular offset.

The errors in terms of the offset and the offset angle may be combined. In this manner, the stiffeners of the stiffened panels may have an angular offset $\theta$ and/or an offset e.

According to the invention, the assembly method of the stiffened panels 32, 34 involves using a set of battens 44, 44', 54, 58, 58' with different values for the offset d and/or the angular offset $\Delta$, evaluating the offset e and/or the offset angle $\theta$ between the bearing surfaces of the stiffeners 32R (or 32R') and 34R (or 34R'), selecting from the set of battens the batten which has an offset d and/or an angular offset $\Delta$ substantially equal to the offset e and/or the offset angle $\theta$ of the bearing surfaces of the stiffeners 32R (or 32R') and 34R (or 34R'), and fixing the selected batten to the stiffeners 32R (or 32R') and 34R (or 34R') using any appropriate means.

The method according to the invention allows the assembly to be simplified and assembly time to be reduced in that it is no longer necessary to interpose wedges between the stiffener and the batten or to adjust the battens by means of machining.

According to another advantage, the battens according to the invention limit the deformations of the stiffeners and therefore the occurrence of stresses.

According to a production control method, the battens are supplied in accordance with a method of the Kanban type. In this manner, the different models of battens are produced in accordance with the requirements at the assembly station.

This assembly method is more specifically suitable for assembling a front lower fuselage section and a front beam as illustrated in FIGS. 7, 8, 12 to 16.

The front lower fuselage section corresponds to a stiffened panel 32 and the front beam corresponds to a stiffened panel 34.

The front beam 34 comprises a lower panel which corresponds to the panel 34P, T-shaped stringers which correspond to stiffeners 34R and side panels which correspond to stiffeners 34R'.

The front lower fuselage section 32 comprises a lower panel which corresponds to the panel 32P, T-shaped stringers in continuation of the T-shaped stringers of the front beam which correspond to stiffeners 32R and T-shaped stringers in continuation of the side panels of the front beam which correspond to stiffeners 32R'.

As in the prior art, the stiffeners 32R of the front lower fuselage section do not extend beyond the rear edge 66 of the front lower fuselage section. In the same manner, the stiffeners 34R of the front beam do not extend beyond the front edge 70 of the front beam. For each pair of stiffeners 32R and 34R, the stiffeners are connected by means of two battens 44, 44', 54 (as illustrated in FIGS. 5, 13, 15 and 16) which are arranged at one side and the other of the stiffeners 32R and 34R and which are adapted in accordance with the alignment error found between the stiffeners.

According to a specific feature of the invention which can be seen in FIG. 7, the stiffeners 34R' which correspond to the side panels of the front beam each comprise an extension 68 which extends beyond the front edge 70 of the front beam so as to protrude over the panel 32P of the front lower fuselage section. In this manner, the end 72 of each stiffener 34R' and the front edge 70 are separated by a distance D. In a complementary manner, the stiffeners 32R' of the front lower fuselage section do not reach the rear edge 66 of the front lower fuselage section. In this manner, the end 76 of each stiffener 32R' and the rear edge 66 are separated by a distance which is substantially equal to the distance D so that the thicknesses 32R' and 34R' are arranged end-to-end.

This configuration ensures better transmission of the forces between the front beam and the front lower fuselage section and increased rigidity with respect to the flexion of the fuselage. In this manner, consequently, it is no longer necessary to widen the front end of the front beam.

According to another specific feature of the invention, only the core 36 of the stiffeners 34R' extends beyond the front edge 70 of the front beam. In this manner, the extension 68 of the stiffeners 34R' does not comprise a base 38. This arrangement prevents the bases of the stiffeners 34R' which are fixedly joined to the front beam from also being in contact with the front lower fuselage section and "absorbs" the offsets in a direction substantially orthogonal to the panel 32P or 34P between the front beam and the front lower fuselage section.

Preferably, as illustrated in FIG. 7, the core 36 of each stiffener 34R' comprises a cut-out 78 in the region of the lower edge thereof (close to the panel 34P) in a state perpendicular relative to the front edge 70 of the front beam. Advantageously, the cut-out 78 has a substantially elliptical curved shape, in order to prevent concentrations of stresses.

Figure 14:
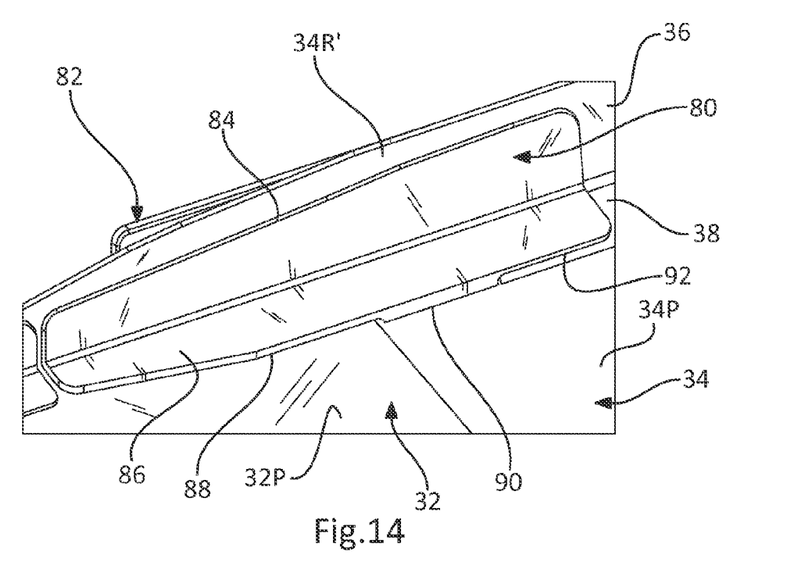
FIG. 14 is a perspective view of an attach angle ensuring the connection between a side panel of a front beam and a reinforcement of a front lower fuselage section.

Advantageously, for each stiffener 34R', the assembly of the front beam and the front lower fuselage section comprises an external attach angle 80 and an internal attach angle 82 which are arranged at one side and the other of each stiffener 34R', the attach angles 80, 82 being arranged so as to straddle the front beam and the front lower fuselage section.

The attach angles 80 and 82 have an L- or I-shaped profile and are preferably produced from composite material. The attach angles 80 and 82 preferably have an L-shaped profile in order to ensure optimum transfer from the core of the side panel to the front lower fuselage section.

According to an embodiment, an attach angle 80 or 82 comprises a first wing 84 which is pressed against the core 36 of the stiffener 34R' and which is fixed thereto using any appropriate means and a second wing 86 which is pressed and fixed against the panel 32P of the front lower fuselage section, the panel 34P of the front beam and optionally the base 38 of the stiffeners 34R'.

According to an embodiment, one of the faces of the second wing 86 comprises a first contact surface 88 with respect to the panel 32P of the front lower fuselage section, a second contact surface 90 with respect to the panel 34P of the front beam and a third contact surface 92 with respect to the base 38 of the stiffener 34R'. These contact surfaces 88, 90, 92 are not coplanar in order to take into account offsets between the panels 32P, 34P and the base 38.

These attach angles 80 and 82 allow the transfer of force between the side panels of the front beam and the front lower fuselage section and the protection of the cut-outs 78 which are formed in the side panels to be ensured.

Figure 12:
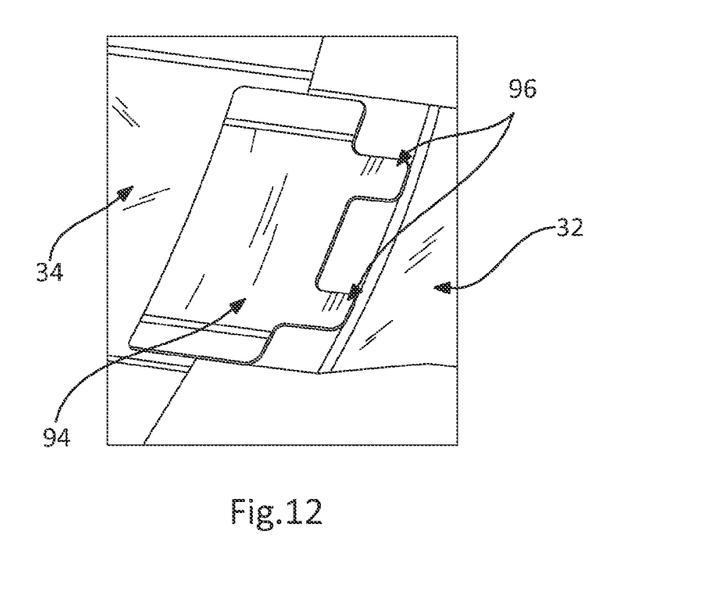
FIG. 12 is a view from the outer side of the fuselage of the connection zone between a front beam and a front lower fuselage section of an aircraft illustrating the invention.
Figure 13:
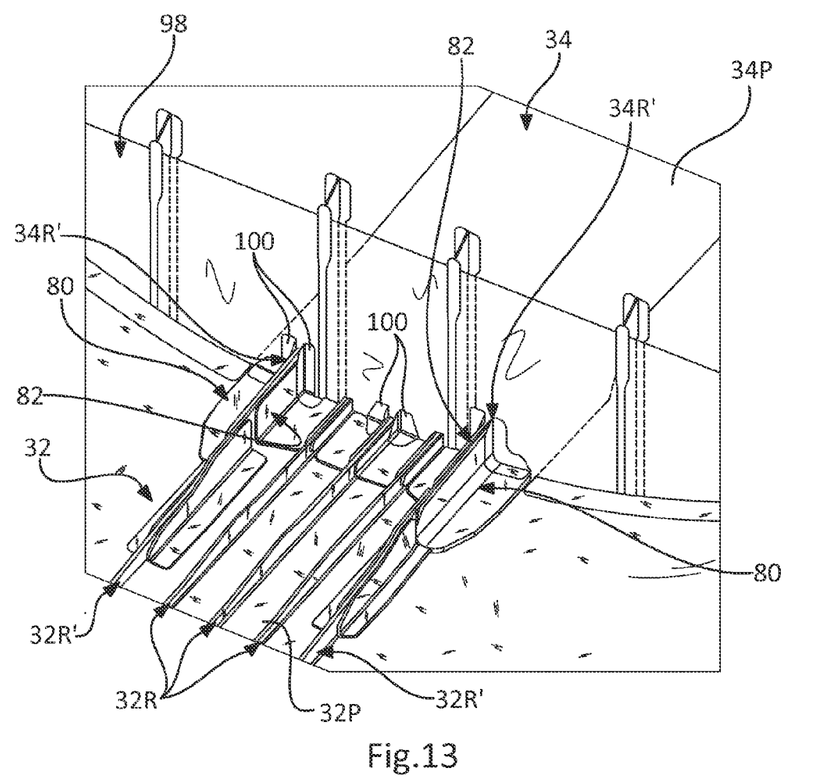
FIG. 13 is a view from the inner side of the fuselage of the connection zone between a front beam and a front lower fuselage section of an aircraft illustrating the invention.

As illustrated in FIG. 12, the connection between the front beam and the front lower fuselage section comprises a ferrule 94 which is pressed against the outer surfaces of the front beam and the front lower fuselage section. Advantageously, this ferrule 94 is of composite material. This ferrule comprises two extensions 96. These extensions are not indispensable but may allow in some cases better distribution of the forces which pass through the fixings of the connection.

This ferrule 94, with the battens 44, 44', 54, 58, 58' and the attach angles 80, 82, enables a dual-shearing front beam/front lower fuselage section connection to be obtained.

Figure 15:
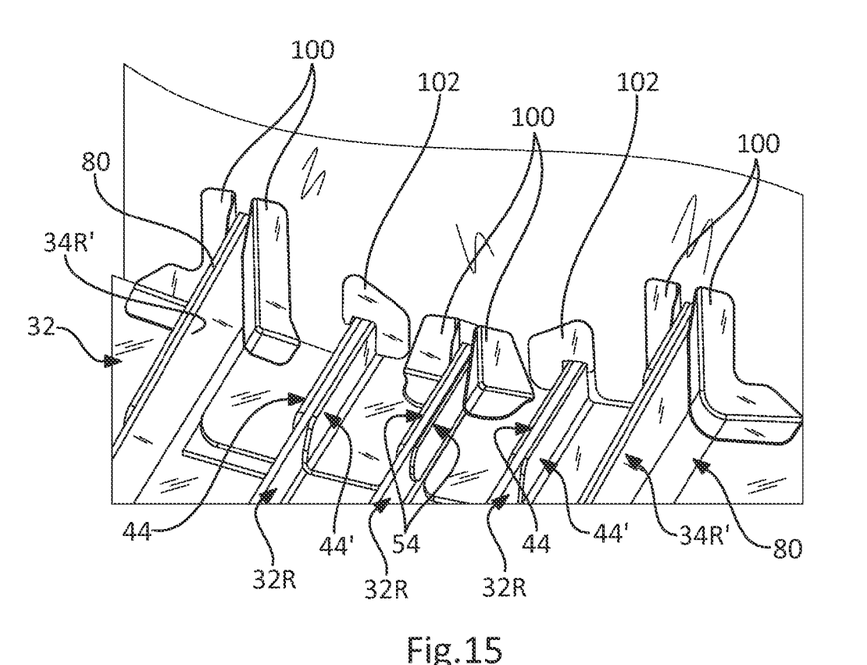
FIG. 15 is a perspective view from the front lower fuselage section of the connection zone between a front beam, a front lower fuselage section and a sealed wall of an aircraft illustrating the invention.
Figure 16:
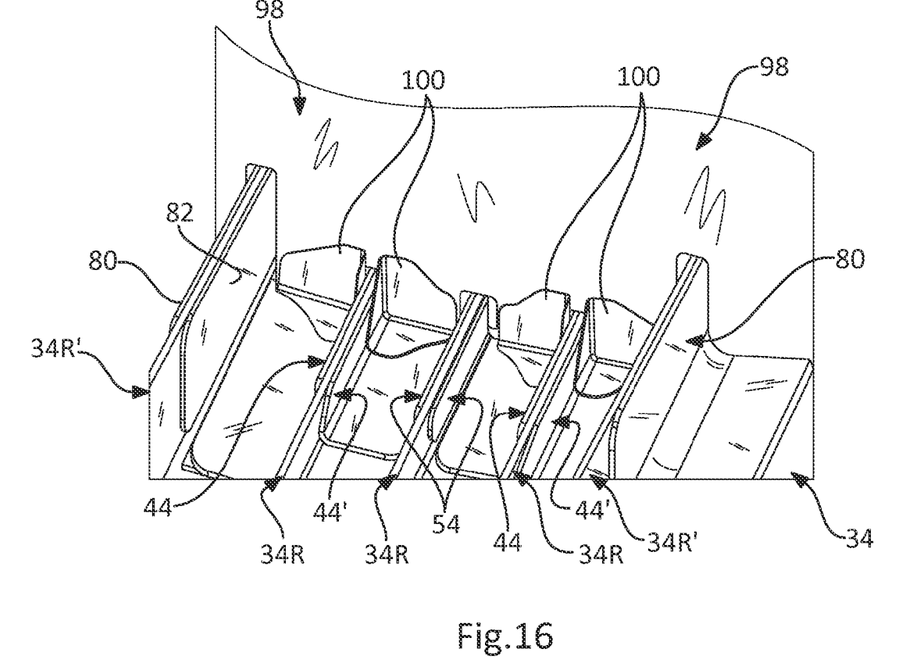
FIG. 16 is a perspective view from the front beam of the connection zone between a front beam, a front lower fuselage section and a sealed wall of an aircraft illustrating the invention.

A sealed wall 98 is arranged in a transverse plane which substantially corresponds to the connection plane between the front beam and the front lower fuselage section.

According to a specific feature of the invention, the sealed wall 98 comprises cut-outs in order to allow the stiffeners 34R' and the battens and any attach angles provided to pass in order to connect the stiffeners 32R, 32R', 34R and 34R'. In this manner, in contrast to the prior art, the sealed wall 98 does not interrupt the continuity of the stiffeners which pass through it. This design promotes the transmission of forces between the front beam and the front lower fuselage section so that it is possible to reduce the width of the front edge 70 of the front beam via which the forces pass.

Sealing means are provided between, on the one hand, the sealed wall 98 and, on the other hand, the assembly formed by the front beam, the front lower fuselage section, the battens and any attach angles.

According to an embodiment, as illustrated in FIGS. 15 and 16, fittings 100 and/or plates 102 are arranged at one side and the other of the sealed wall 98.

The fittings are components which comprise three mutually perpendicular walls, a first wall being pressed against the sealed wall 98, a second wall being parallel with the panel 32P or 34P, and a third wall being parallel with the core of the stiffeners.

According to an embodiment, the fittings 100 are of titanium and ensure a structural function by transmitting the forces between, on the one hand, the sealed wall and, on the other hand, the front lower fuselage section and the front beam.

According to an embodiment, the plates 102 which do not have a structural function are of composite material.

In the case of a front beam comprising three stiffeners 34R between the side panels, as illustrated in FIG. 16, fittings 100 are provided at one side and the other of the stiffeners 34R which are close to the side panels, at the side of the front beam.

As illustrated in FIG. 15, at the side of the front lower fuselage section, fittings 100 are arranged at one side and the other of the side panels and the stiffener 32R located at the centre of the two side panels. Plates 102 are fixed against the sealed wall 98 above the stiffeners 32R which are close to the side panels.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft comprising:
   a front lower fuselage section having stiffeners, and
   a front beam having stiffeners including first stiffeners which correspond to stringers and second stiffeners which correspond to side panels, some of the second stiffeners of the front beam comprising an extension which extends beyond a front edge of the front beam in order to move into a perpendicular state relative to the front lower fuselage section,
   each stiffener comprising a core and at least one bearing surface,
   each stiffener of the front beam being connected to a stiffener of the lower fuselage section by means of at least one batten which is pressed against the bearing surfaces of the stiffeners,
   a sealed wall being arranged in a transverse plane which corresponds approximately to the connection plane between the front beam and the front lower fuselage section,
   wherein the sealed wall comprises cut-outs in order to allow the stiffeners and the battens to pass.

2. The aircraft according to claim 1, further comprising a seal between the sealed wall and the assembly formed by the front beam, the front lower fuselage section, and the battens.

3. The aircraft according to claim 2, wherein the seal comprises fittings having three mutually perpendicular walls, a first wall pressed against the sealed wall, a second wall parallel with the panel and a third wall parallel with the core of the stiffeners, the fittings being made of titanium and transmitting forces between, on the one hand, the sealed wall and, on the other hand, the front lower fuselage section and the front beam.

4. Aircraft according to claim 2, wherein the seal comprises plates of composite material which are fixed against the sealed wall above the stiffeners.

5. The aircraft according to claim 1, wherein the front lower fuselage section comprises
   front stiffeners which extend in continuation of the first stiffeners of the front beam and
   second stiffeners which extend in continuation of the second stiffeners of the front beam and
   wherein the second stiffeners of the front lower fuselage section each comprise an end which is remote from the rear edge of the front lower fuselage section so that the second stiffeners of the front beam and the front lower fuselage section are arranged end-to-end.

6. The aircraft according to claim 5, wherein the core of the second stiffeners of the front beam comprises a cut-out in the region of the lower edge thereof, perpendicular to the front edge of the front beam.

7. The aircraft according to claim 6, wherein each cut-out has a substantially elliptical, curved shape.

8. The aircraft according to claim 5, further comprising, for each second stiffener of the front beam, an external attach angle and an internal attach angle which are arranged at one side and the other of the second stiffener, the attach angles being arranged so as to straddle the front beam and the front lower fuselage section.

9. The aircraft according to claim 1, further comprising, for each pair of stiffeners, two battens which are arranged at one side and the other of the cores of the stiffeners in order to obtain a dual-shearing assembly.

* * * * *